United States Patent
Kim et al.

(10) Patent No.: US 10,801,611 B1
(45) Date of Patent: Oct. 13, 2020

(54) METHOD OF CONTROLLING LINE PRESSURE OF HYDRAULIC CIRCUIT OF TRANSMISSION

(71) Applicants: Hyundai Motor Company, Seoul (KR); Kia Motors Corporation, Seoul (KR)

(72) Inventors: Jin Sung Kim, Hwaseong-si (KR); Young Ho Ko, Yongin-si (KR); Young Min Yoon, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/531,439

(22) Filed: Aug. 5, 2019

(30) Foreign Application Priority Data

Apr. 1, 2019 (KR) .................. 10-2019-0037829

(51) Int. Cl.
*F16H 61/00* (2006.01)
*F16H 61/02* (2006.01)

(52) U.S. Cl.
CPC ..... *F16H 61/0031* (2013.01); *F16H 61/0274* (2013.01); *F16H 2061/009* (2013.01); *F16H 2061/0037* (2013.01)

(58) Field of Classification Search
CPC . F16H 61/0031; F16H 61/009; F16H 61/0021
See application file for complete search history.

(56) References Cited

U.S. PATENT DOCUMENTS

| | | | | |
|---|---|---|---|---|
| 5,836,347 A | * | 11/1998 | Harries | B62D 5/07 137/487.5 |
| 6,769,502 B2 | * | 8/2004 | Nakamori | B60K 6/547 180/65.25 |
| 7,958,983 B2 | | 6/2011 | Schiele et al. | |
| 8,467,947 B2 | * | 6/2013 | Zollner | B60W 20/10 701/66 |
| 8,618,765 B2 | * | 12/2013 | Sano | H02P 21/18 318/721 |
| 9,309,881 B2 | * | 4/2016 | Uda | F16H 61/0031 |
| 9,631,721 B2 | | 4/2017 | Takagi | |

(Continued)

FOREIGN PATENT DOCUMENTS

| | | |
|---|---|---|
| JP | 2006-336725 A | 12/2006 |
| JP | 2015-105696 A | 6/2015 |

(Continued)

*Primary Examiner* — Sherry L Estremsky
(74) *Attorney, Agent, or Firm* — Morgan, Lewis & Bockius LLP

(57) ABSTRACT

A method of controlling line pressure of a hydraulic circuit of a transmission, may include turning on electric current by a controller to apply the electric current to an electric oil pump and determining line pressure depending on the electric current applied; and turning off the electric current by the controller so that the electric current being applied to the electric oil pump is cut off when the determined line pressure is greater than a predetermined reference upper limit value, estimating line pressure dropping down with a passage of time and determining the estimated line pressure, wherein when the estimated line pressure becomes lower than a predetermined reference lower limit value, the turning on the electric current is repeated.

6 Claims, 5 Drawing Sheets

(56) References Cited

U.S. PATENT DOCUMENTS

| | | | |
|---|---|---|---|
| 9,683,573 B2* | 6/2017 | Kagawa | F04D 25/06 |
| 10,738,841 B2* | 8/2020 | Ko | F16D 25/10 |
| 2004/0179962 A1* | 9/2004 | Hopper | F16H 61/0031 |
| | | | 417/426 |

FOREIGN PATENT DOCUMENTS

| | | |
|---|---|---|
| JP | 2018-021599 A | 2/2018 |
| KR | 10-2012-0063258 A | 6/2012 |

* cited by examiner

METHOD OF CONTROLLING LINE PRESSURE OF HYDRAULIC CIRCUIT OF TRANSMISSION

CROSS-REFERENCE(S) TO RELATED APPLICATIONS

The present application claims priority to Korean Patent Application No. 10-2019-0037829, filed Apr. 1, 2019, the entire contents of which is incorporated herein for all purposes by this reference.

BACKGROUND OF THE DISCLOSURE

Field of the Disclosure

The present invention relates to a method of controlling line pressure of a hydraulic circuit of a transmission, and more particularly, to a technique for controlling the line pressure to be regulated uniformly without the need of a sensor for directly measuring the line pressure.

Description of Related Art

FIG. 1 illustrates a hydraulic circuit of a wet type dual clutch transmission (DCT) to which embodiments of the present invention may be applied, wherein hydraulic fluid to be pumped by an electric oil pump 502 to be controlled by a controller 500 is supplied to, via a check valve 504, a main hydraulic line 506 in which line pressure is formed and the hydraulic fluid in the main hydraulic line 506 is supplied to operate a first clutch 510 and a second clutch 512 through clutch pressure control solenoid valves 508 and to drive a gear actuator 518 through a pressure control solenoid valve 514 and a flow rate control solenoid valve 516 for the gear actuator.

As seen from the figure, the gear actuator 518 and the flow rate control solenoid valve 516 for the gear actuator are shown simply as one respectively although each thereof is provided substantially in plural. Furthermore, each of the first clutch and second clutch 510 and 512 is provided with a hydraulic pressure sensor 520 such that the first clutch and second clutch 510 and 512 may be precisely controlled. Also, each of inlet and outlet sides of the electric oil pump 502 is provided with a filter 522. Furthermore, a clutch fail-safe solenoid valve 524, an accumulator 526, a line relief valve 528 and a pressure sensor 530 for the main hydraulic line are connected to the main hydraulic line 506.

The line pressure of the main hydraulic line 506 may be maintained at a constant level. Accordingly, in the related art, when the line pressure measured by the pressure sensor 530 for the main hydraulic line drops down below a predetermined reference lower limit value, control for maintaining the line pressure is performed such that the electric oil pump 502 is actuated until the line pressure reaches a predetermined upper limit value.

However, as it is costly to install the pressure sensor 530 for the main hydraulic line in the main hydraulic line 506, it is highly desirable to maintain the line pressure of the main hydraulic line 506 at a proper level without the need of mounting the pressure sensor for the main hydraulic line.

The information included in this Background of the Invention section is only for enhancement of understanding of the general background of the invention and may not be taken as an acknowledgment or any form of suggestion that this information forms the prior art already known to a person skilled in the art.

BRIEF SUMMARY

Various aspects of the present invention are directed to providing a method of controlling line pressure of a hydraulic circuit of a transmission to maintain the line pressure at a proper level without using any pressure sensor for directly measuring the line pressure of the hydraulic circuit of the transmission so that cost of the transmission is reduced.

In accordance with one aspect of the present invention for accomplishing the object as mentioned above, there may be provided a method of controlling line pressure of a hydraulic circuit of a transmission, including: turning on electric current by a controller to apply the electric current to an electric oil pump and determining line pressure depending on the electric current applied; and turning off the electric current by the controller so that the electric current being applied to the electric oil pump is cut off when the determined line pressure is greater than a predetermined reference upper limit value, estimating line pressure dropping down with a passage of time and determining the estimated line pressure, wherein when the estimated line pressure becomes lower than a predetermined reference lower limit value, the turning on the electric current is repeated.

In the turning on electric current, the line pressure may be determined by the following equation:

$$\tau_{ion}(\omega_{tgt}) \frac{di_f}{dt} = i_f + i_{meas}, \ i_f(0) = i_{meas}$$

$$P_L = ai_f + b \text{ for } i > 0$$

Where
$\tau_{ion}$: time constant of prediction model,
$\omega_{tgt}$: target rotation speed of the electric oil pump,
$i_f$: electric current predicted value,
$i_{meas}$: electric current measured value,
$P_L$: line pressure, and
a, b: parameters according to experimental data.

In the turning off the electric current, the estimated line pressure may be determined by the following equation:

$$\dot{\hat{P}}_L = -k_p(\hat{P}_L - \overline{P}_L^k), \ \hat{P}_L(0) = P_L(①)$$

$k_p$: parameter according to experimental data,
$\hat{P}_L$: estimated line pressure,
$\overline{P}_L^k$: lower limit pressure predicted value (in the k-th cycle),
$\hat{P}_L(0)$: initial value of the estimated line pressure, and
$P_L(①)$: line pressure at the time of turning off electric current of the electric oil pump.

The lower limit pressure predicted value in the next cycle (the (k+1)-th cycle) following the k-th cycle may be determined by the following equation:

$$\overline{P}_L^{k+1} = \overline{P}_L^k + k_a[P_L^k - (P_{tgt} - \Delta P_l)]$$

$\overline{P}_L^{k+1}$: lower limit pressure predicted value (in the (k+1)-th cycle),
$\overline{P}_L^k$: lower limit pressure predicted value (in the k-th cycle),
$k_a$: tuning variable,
$P_L^k$: line pressure at the time of turning on electric current of the electric oil pump in the k-th cycle,
$P_{tgt}$: target line pressure, and
$(P_{tgt} - \Delta P_l)$: reference lower limit value.

Prediction for obtaining the lower limit pressure predicted value for the (k+1)-th cycle may be performed only when the electric oil pump is turned on in the k-th cycle.

The turning on the electric current and the turning off the electric current may be repeatedly performed from the time point when the controller is turned on after a vehicle is turned on to the time point when the vehicle is turned off.

Embodiments of the present invention make it possible to control line pressure of a fluid line of a transmission to be maintained at a proper level without using any pressure sensor for directly measuring the line pressure of the hydraulic circuit of the transmission, reducing cost of the transmission.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
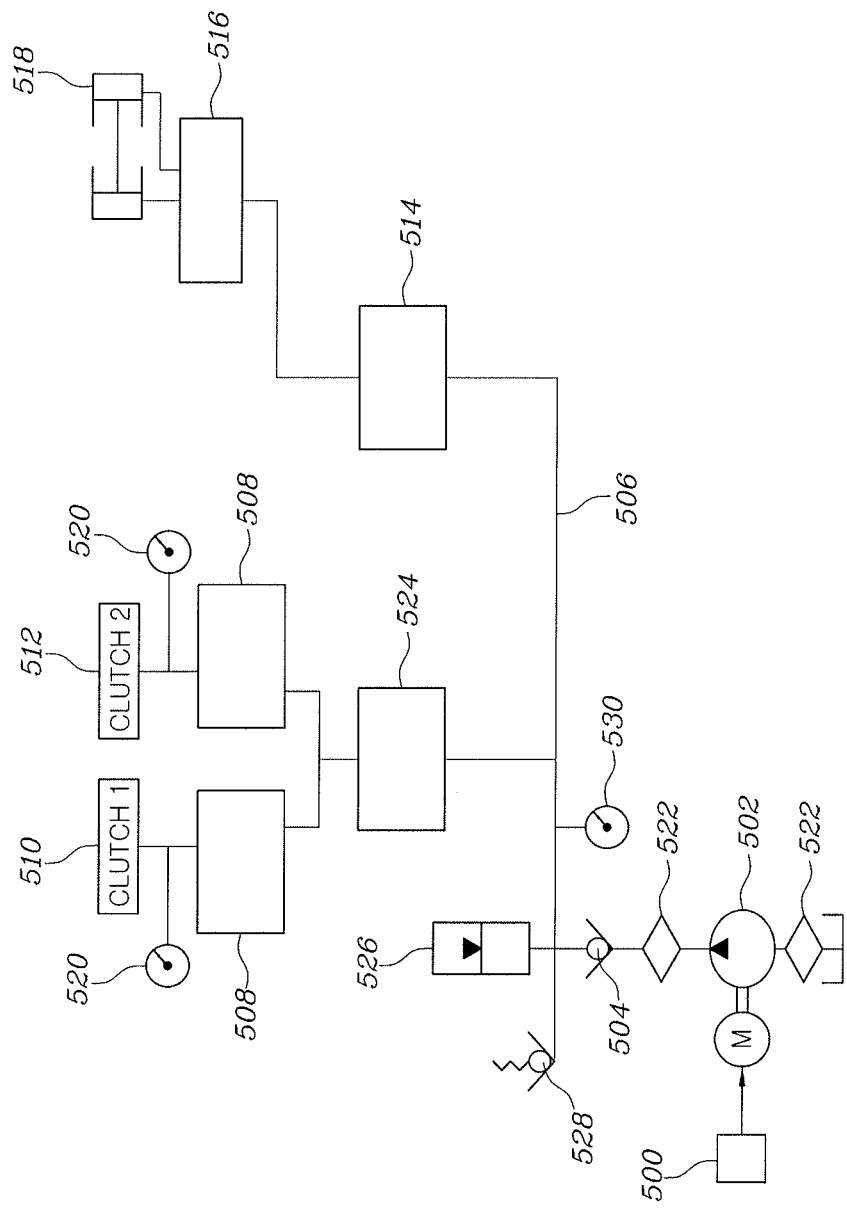
FIG. 1 is a diagram of a hydraulic circuit to which an exemplary embodiment of the present invention may be applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
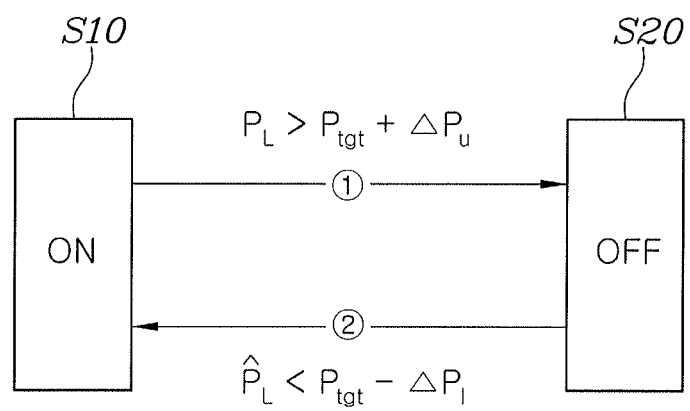
FIG. 2 is a schematic view showing concept of a method of controlling line pressure of a hydraulic circuit of a transmission, according to an exemplary embodiment of the present invention.
Figure 3:
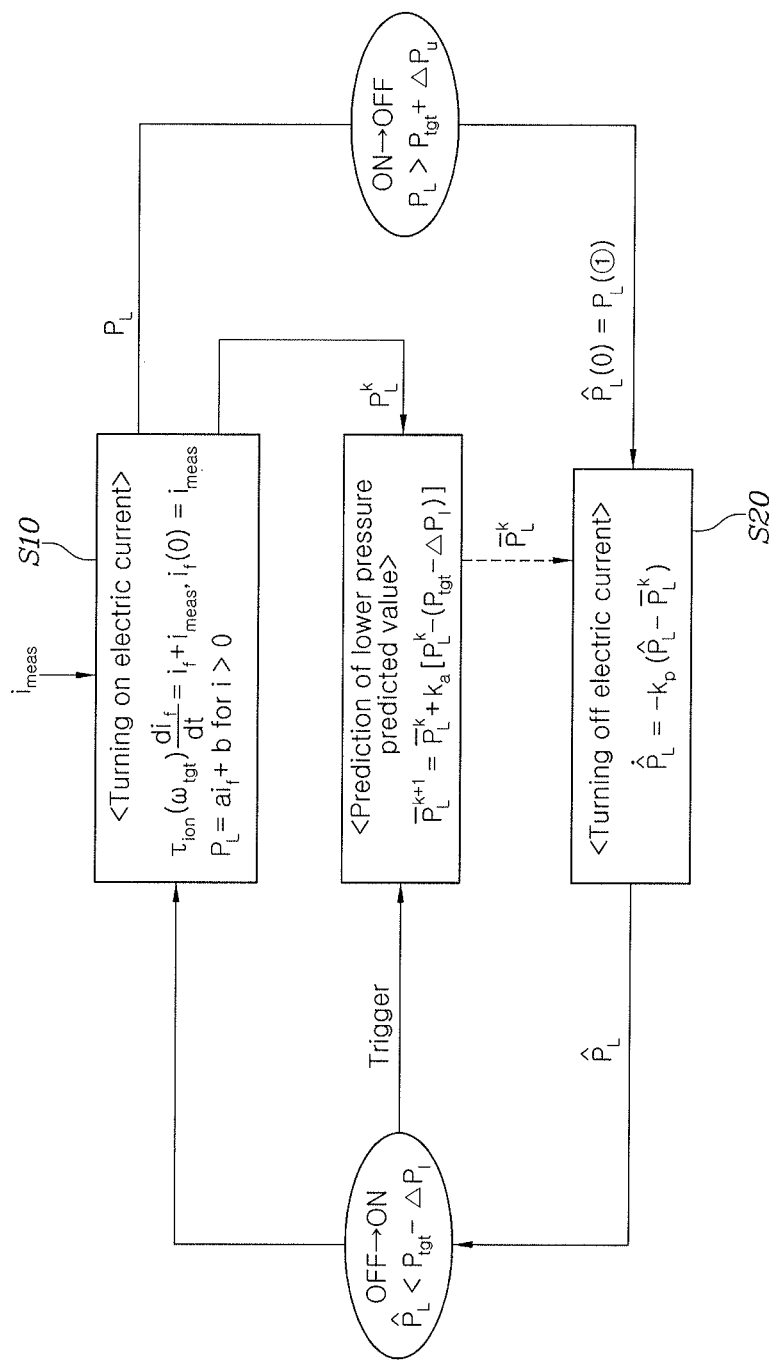
FIG. 3 is a block diagram illustrating a method of controlling line pressure of a hydraulic circuit of a transmission, according to an exemplary embodiment of the present invention.

Referring to FIG. 2 which is a schematic view showing concept of a method of controlling line pressure of a hydraulic circuit of a transmission, according to an exemplary embodiment of the present invention, the method may include a stage S10 of turning on electric current by a controller to apply the electric current to an electric oil pump and determining line pressure depending on the electric current applied; and a stage S20 of turning off the electric current by the controller so that the electric current being applied to the electric oil pump is cut off when the determined line pressure is greater than a predetermined reference upper limit value, estimating line pressure dropping down with a passage of time and determining the estimated line pressure, wherein when the estimated line pressure becomes lower than a predetermined reference lower limit value, the turning on electric current is performed such that the turning on the electric current and the turning off the electric current are repeated continuously.

The controller is configured to determine the line pressure based on the electric current applied to the electric oil pump in the turning on electric current. As such, if it is determined that the line pressure is higher than the reference upper limit value, the controller turns off the electric oil pump and estimates that the line pressure will drop down with a passage of time and determines the estimated line pressure. Afterwards, when the estimated line pressure drops down below the reference lower limit value, the controller performs the turning on electric current while applying electric current to the electric oil pump again. In the present way, the turning on the electric current and the turning off the electric current are performed repeatedly so that the line pressure may be maintained near the target line pressure without the need of mounting a separate pressure sensor.

Figure 4:
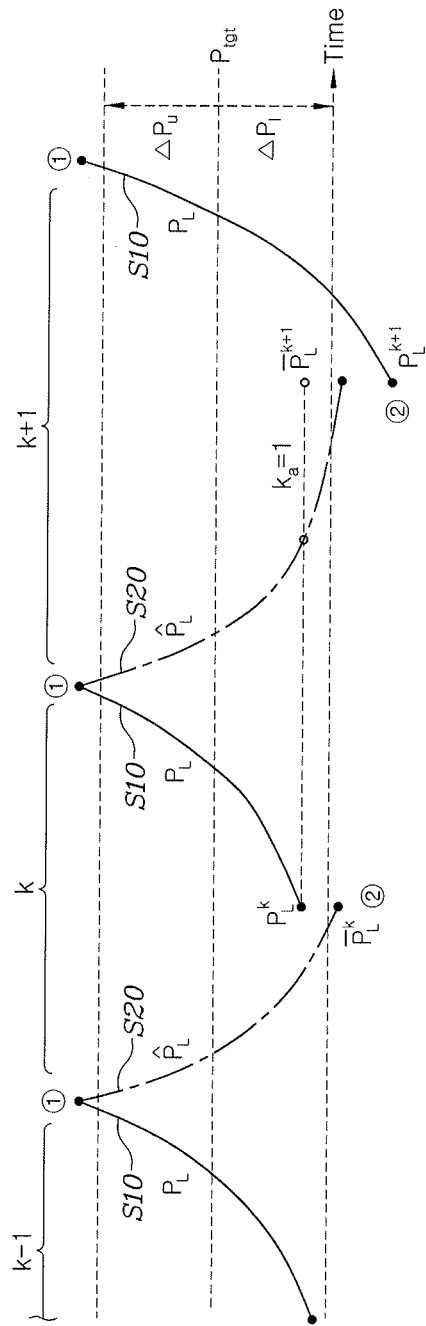
FIG. 4 is a graph illustrating control of line pressure with a passage of time in the case where an exemplary embodiment of the present invention is applied.

Here, as marked in FIGS. 2 and 4, the mark "①" refers to switching from a state of turning on to a state of turning off electric current of the electric oil pump while the mark "②" refers to switching from a state of turning off to a state of turning on electric current of the electric oil pump.

Furthermore, $P_{tgt}+\Delta P_u$ refers to the reference upper limit value while $P_{tgt}-\Delta P_l$ refers to the reference lower limit value. Here, $P_{tgt}$ is a target line pressure and $\Delta P_u$ means a difference between an allowable maximum line pressure and the target line pressure ($P_{tgt}$), and $\Delta P_l$ means a difference between the target line pressure ($P_{tgt}$) and an allowable minimum line pressure.

In the turning on electric current, the line pressure is determined by the following equation 1:

$$\tau_{ion}(\omega_{tgt})\frac{di_f}{dt} = i_f + i_{meas}, \; i_f(0) = i_{meas} \quad \text{[Equation 1]}$$

$$P_L = ai_f + b \text{ for } i > 0$$

Where
$\tau_{ion}$: time constant of prediction model,
$\omega_{tgt}$: target rotation speed of the electric oil pump,
$i_f$: electric current predicted value,
$i_{meas}$: electric current measured value,
$P_L$: line pressure, and
a, b: parameters according to experimental data.

In other words, when the electric oil pump is controlled to actuate at the target rotation speed, the controller inputs a current measurement value $i_{meas}$ to a model of electric current being supplied to the electric oil pump and at the same time determines the current predicted value $i_f$ through operation by numerical integration. As such, the controller is configured to determine the line pressure $P_L$ by applying the parameters a and b to the current predicted value $i_f$.

It is natural that the parameters a and b are preferably determined by design considerations obtained by performing a plurality of experiments which adopt a mode of actually measuring the line pressure which varies as the electric current is applied to the electric oil pump.

In the turning off the electric current, the estimated line pressure is determined by the following equation 2:

$$\dot{\hat{P}}_L = -k_p(\hat{P}_L - \overline{P}_L^k), \hat{P}_L(0) = P_L(①)$$ [Equation 2]

$k_p$: parameter according to experimental data,
$\hat{P}_L$: estimated line pressure,
$\overline{P}_L^k$: lower limit pressure predicted value (in the k-th cycle),
$\hat{P}_L(0)$: initial value of the estimated line pressure, and
$P_L(①)$: line pressure at the time of turning off electric current of the electric oil pump.

A model for the estimated line pressure is determined by numerical integration to determine the estimated line pressure. An initial value $\hat{P}_L(0)$ of the estimated line pressure is substituted with a final value of the line pressure determined while the electric oil pump is actuated in the previous cycle, that is, the line pressure $P_L(①)$ when turning off electric current of the electric oil pump.

Here, the term "cycle" may be defined as a period from a time point when electric current of the electric oil pump is turned off to a time point when electric current of the electric oil pump is turned on and then turned off again, as shown in FIG. 4. This cycle is performed repeatedly in the exemplary embodiment of the present invention.

The lower limit pressure predicted value in the next cycle (the (k+1)-th cycle) following the k-th cycle is determined by the following equation 2:

$$\overline{P}_L^{k+1} = \overline{P}_L + k_a[P_L^k - (P_{tgt} - \Delta P_l)]$$ [Equation 3]

$\overline{P}_L^{k+1}$: lower limit pressure predicted value (in the (k+1)-th cycle),
$\overline{P}_L^{k+1}$: lower limit pressure predicted value (in the k-th cycle),
$k_a$: tuning variable,
$P_L^k$: line pressure at the time of turning on electric current of the electric oil pump in the k-th cycle,
$P_{tgt}$: target line pressure, and
$(P_{tgt} - \Delta P_l)$: reference lower limit value.

Prediction for obtaining the lower limit pressure predicted value for the (k+1)-th cycle is performed only when the electric oil pump is turned on in the k-th cycle.

In other words, assuming that the current cycle is the k-th cycle, this is intended to determine in advance the lower limit pressure predicted value $\overline{P}_L^{k+1}$ for using in determining the estimated line pressure in the (k+1)-th cycle at the time point when electric current of the electric oil pump is turned on while the k-th cycle is performed.

Of course, it is contemplated that a proper initial value is provided arbitrarily because, when the first cycle is performed, the controller cannot determine the lower limit pressure predicted value with the equation 3. For example, the proper initial value may be provided equal to the reference lower limit value.

The lower limit pressure predicted value is a value for using in determining the estimated line pressure in a state where electric current of the electric oil pump is turned off as described above. This value is continuously updated every time based on the lower limit pressure predicted value in the previous cycle. As a result, the line pressure and the estimated line pressure continuously approximate the target line pressure.

Figure 5:
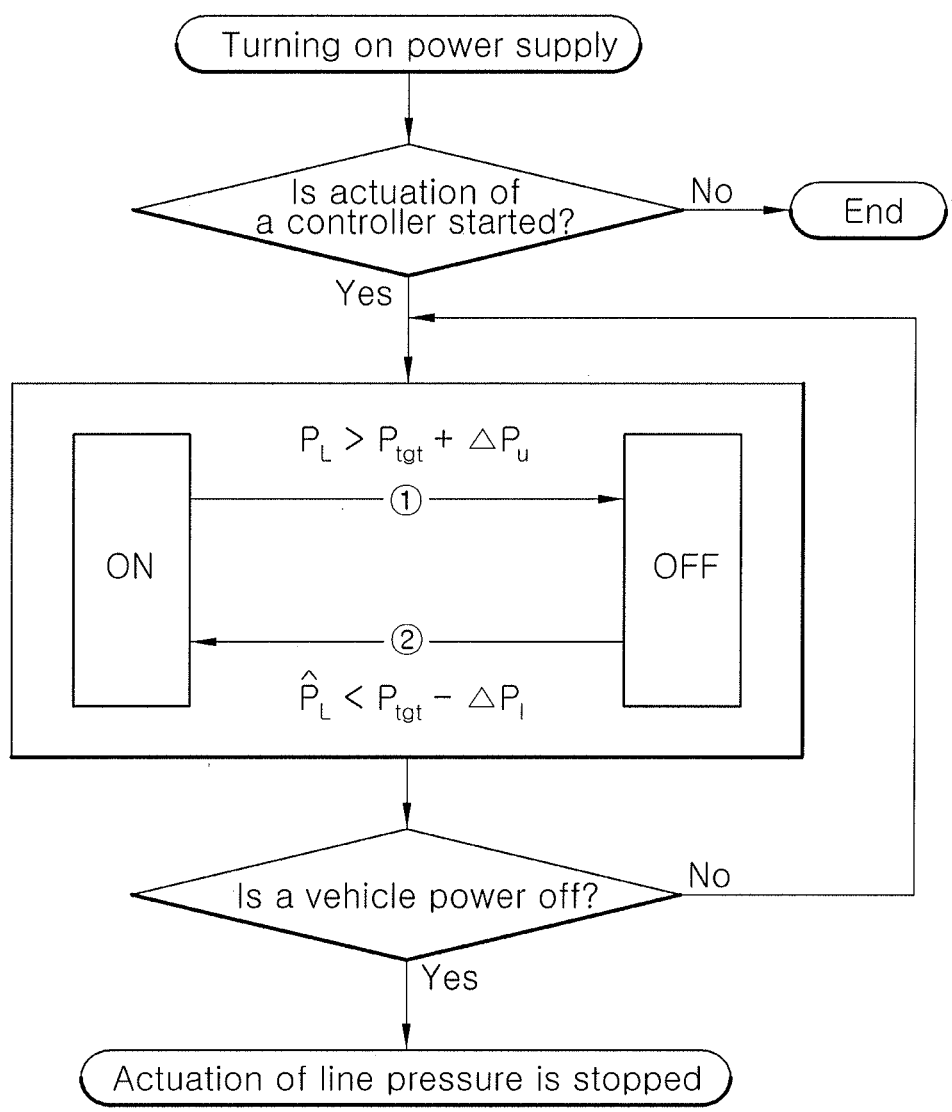
FIG. 5 is a flowchart illustrating an example of applying an exemplary embodiment of the present invention to a vehicle.

In the case where the exemplary embodiment of the present invention is applied to a vehicle as shown in FIG. 5, the turning on the electric current and the turning off the electric current may be repeatedly performed from the time point when the controller is turned on after the vehicle is turned on to the time point when the vehicle is turned off.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling line pressure of a hydraulic circuit of a transmission, the method comprising:
turning on electric current by a controller to apply the electric current to an electric oil pump and determining the line pressure depending on the electric current applied; and
turning off the electric current by the controller so that the electric current being applied to the electric oil pump is cut off in a response that the determined line pressure is greater than a predetermined reference upper limit value, estimating line pressure dropping down with a passage of time and determining the estimated line pressure,
wherein in a response that the estimated line pressure is lower than a predetermined reference lower limit value, the turning on the electric current is repeated.

2. The method of claim 1, wherein in the turning on the electric current, the line pressure depending on the electric current applied is determined by the following equation:

$$\tau_{ion}(\omega_{tgt})\frac{di_f}{dt} = i_f + i_{meas}, i_f(0) = i_{meas}$$

$$P_L = ai_f + b \text{ for } i > 0$$

where
$\tau_{ion}$: time constant of prediction model,
$\omega_{tgt}$: target rotation speed of the electric oil pump,
$i_f$: electric current predicted value,
$i_{meas}$: electric current measured value,
$P_L$: line pressure, and
a, b: parameters according to experimental data.

3. The method of claim 1, wherein in the turning off the electric current, the estimated line pressure is determined by the following equation:

$$\dot{\hat{P}} = -k_p(\hat{P}_L - \overline{P}_L^k), \hat{P}_L(0) = P_L(①)$$

$k_p$: parameter according to experimental data, $\hat{P}_L$: estimated line pressure,
$\overline{P}_L{}^k$: lower limit pressure predicted value in the k-th cycle,
$\hat{P}_L(0)$: initial value of the estimated line pressure, and
$P_L(①)$: line pressure at a time of turning off electric current of the electric oil pump.

4. The method of claim 3, wherein the lower limit pressure predicted value in a next cycle of the (k+1)-th cycle following the k-th cycle is determined by the following equation:

$$\overline{P}_L{}^{k+1} = \overline{P}_L{}^k + k_a[P_L{}^k - (P_{tgt} - \Delta P_l)]$$

$\overline{P}_L{}^{k+1}$: lower limit pressure predicted value (in the (k+1)-th cycle),
$\overline{P}_L{}^k$: lower limit pressure predicted value (in the k-th cycle),
$k_a$: tuning variable,
$P_L{}^k$: line pressure at a time of turning on electric current of the electric oil pump in the k-th cycle,
$P_{tgt}$: target line pressure, and
$(P_{tgt} - \Delta P_l)$: reference lower limit value.

5. The method of claim 4, wherein prediction for obtaining the lower limit pressure predicted value for the (k+1)-th cycle is performed in a response that the electric oil pump is turned on in the k-th cycle.

6. The method of claim 1, wherein the turning on the electric current and the turning off the electric current are repeatedly performed from a time point when the controller is turned on after a vehicle is turned on to a time point when the vehicle is turned off.

\* \* \* \* \*